No. 655,419. Patented Aug. 7, 1900.
F. P. SMITH.
DRY CLOSET AND INCINERATOR.
(Application filed Feb. 11, 1899.)
(No Model.) 3 Sheets—Sheet 2.
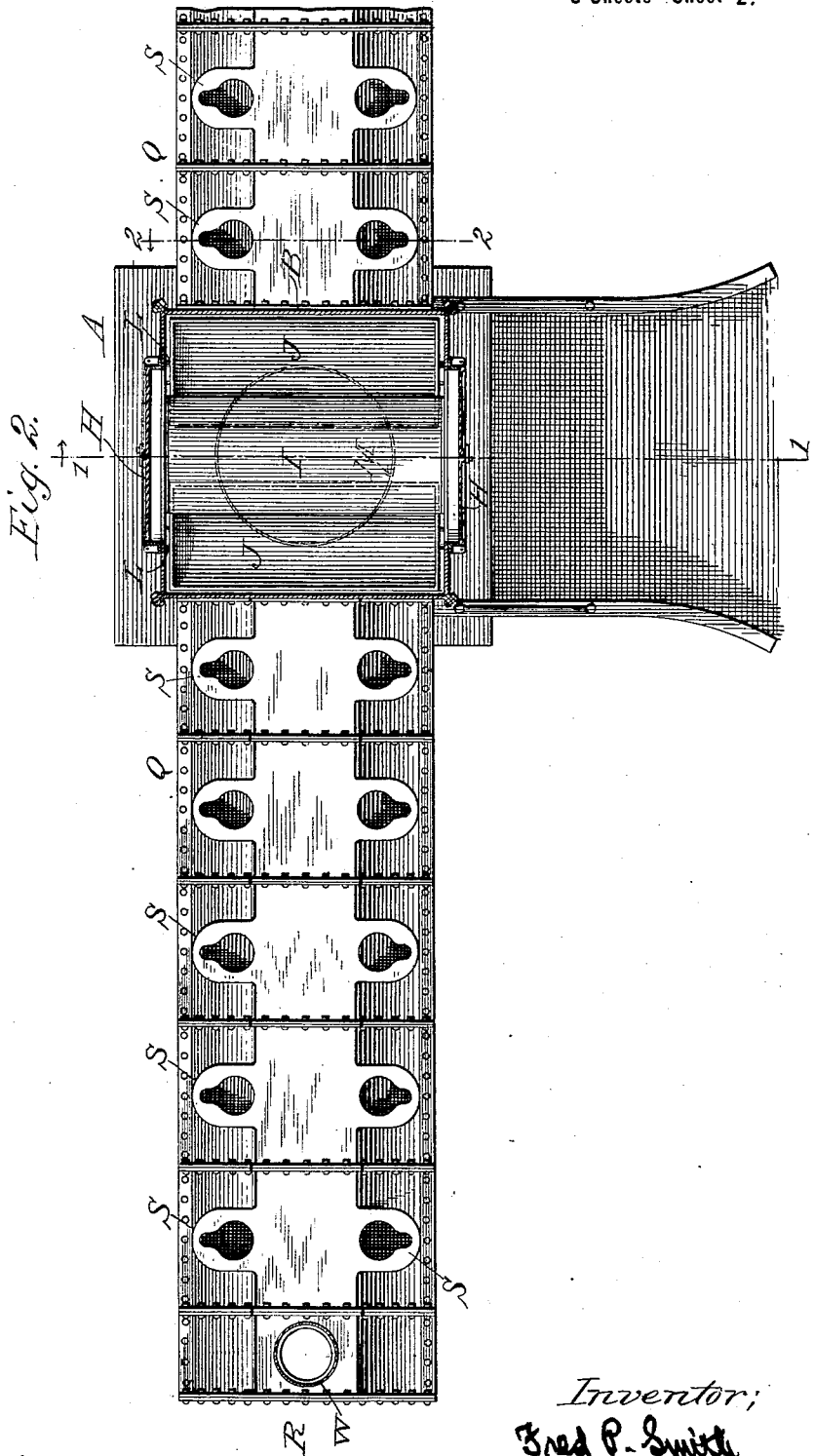

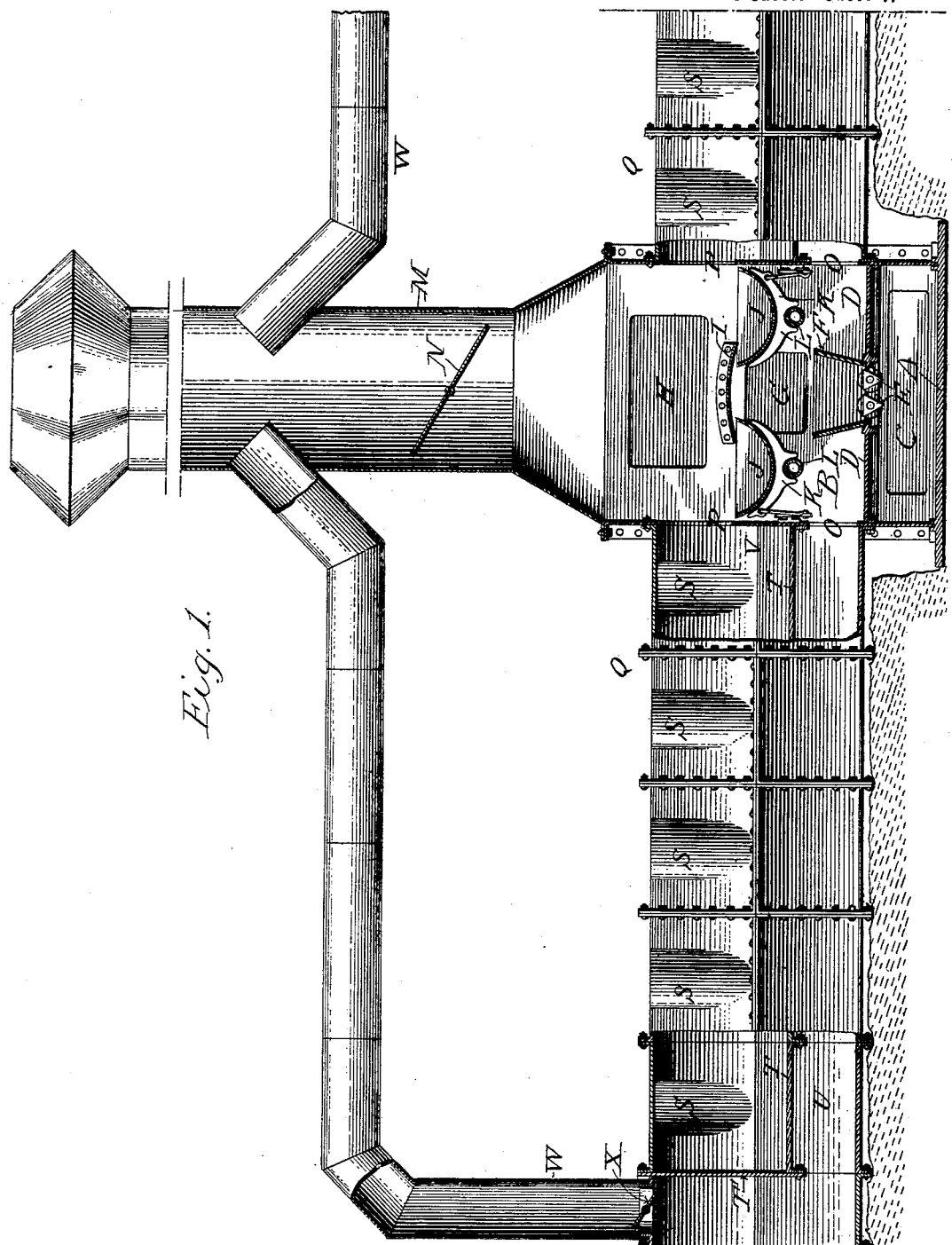

No. 655,419. Patented Aug. 7, 1900.
F. P. SMITH.
DRY CLOSET AND INCINERATOR.
(Application filed Feb. 11, 1899.)
(No Model.) 3 Sheets—Sheet 3.
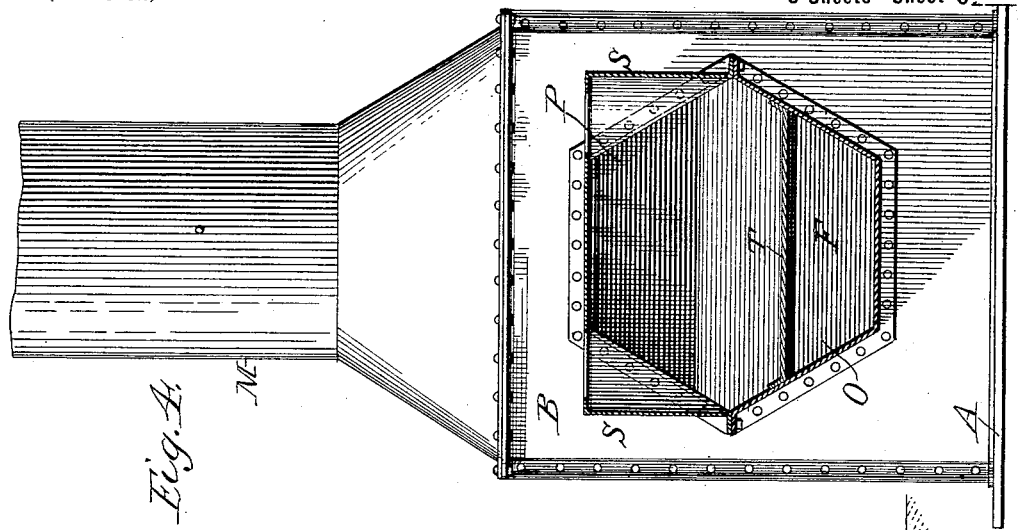
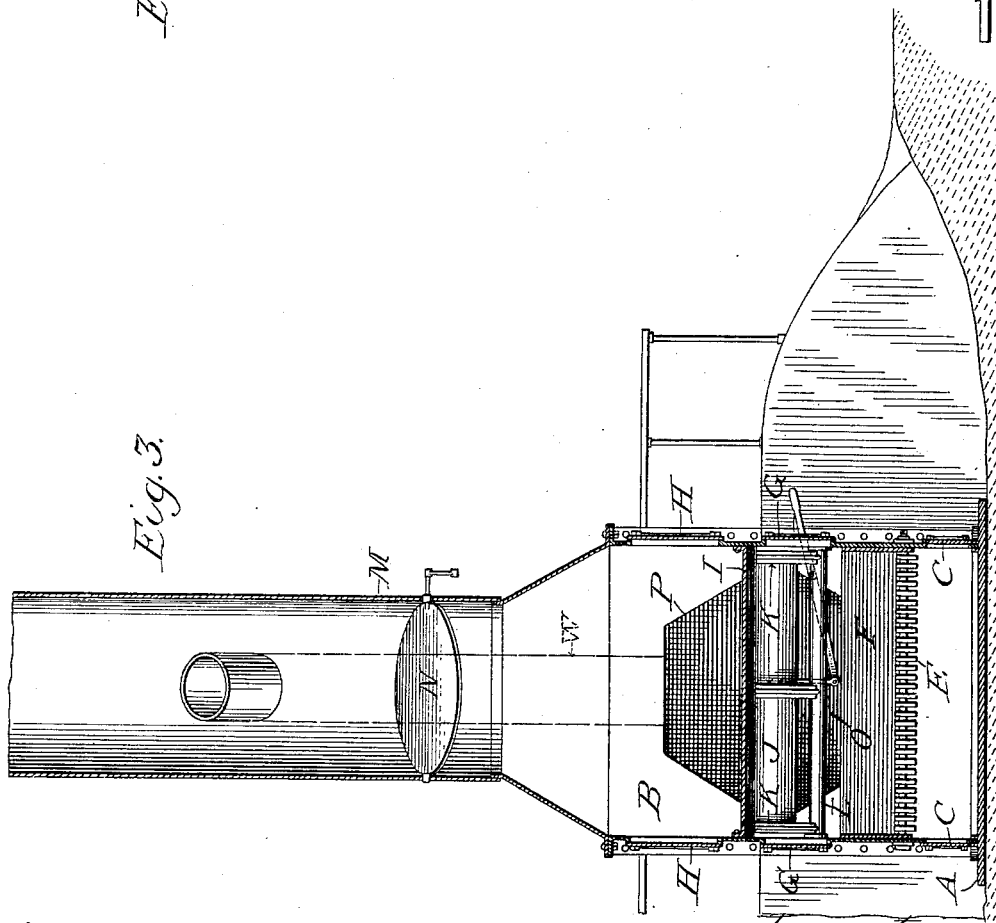
Attest:
C. C. Burdine
D. E. Burdine
Inventor:
Fred P. Smith,
by Dodge and Sons,
Atty's.
THE NORRIS PETERS CO., PHOTO-LITHO., WASHINGTON, D. C.

UNITED STATES PATENT OFFICE.

FRED P. SMITH, OF ALBANY, NEW YORK.

DRY CLOSET AND INCINERATOR.

SPECIFICATION forming part of Letters Patent No. 655,419, dated August 7, 1900.

Application filed February 11, 1899. Serial No. 705,317. (No model.)

*To all whom it may concern:*

Be it known that I, FRED P. SMITH, a citizen of the United States, residing at Albany, in the county of Albany and State of New York, have invented certain new and useful Improvements in Dry Closets and Incinerators, of which the following is a specification.

My present invention pertains to improvements in a combined dry closet and refuse incinerator or burner, the advantages and construction of which will be hereinafter set forth, reference being had to the annexed drawings, wherein—

Figure 1 is a side elevation of a portion of my apparatus, the major part thereof being shown in section; Fig. 2, a top plan view, the main stack or flue being omitted; Fig. 3, a vertical sectional view on the line 1 1 of Fig. 2, the stack or flue being shown; and Fig. 4, a similar view on the line 2 2 of Fig. 2 looking in the direction of the combustion-chamber.

It is a well-known and established fact that in camps where a large number of men are congregated the question of sanitation is one of the hardest and most difficult to solve and that, owing to the common use of the so-called "sinks," disease is often fostered and spread and the water-supply likewise affected. Not only are these conditions brought about by the use of sinks, but the accumulation of rubbish, waste matter, garbage, and the like throughout the camps is also a menace, especially in tropical climates.

The object of my present invention is to provide means for disposing of the fecal excrement and also any refuse, garbage, or other deleterious matter which it may be desired to dispose of.

In the embodiment of my invention herewith shown the apparatus is disclosed in a portable form—that is to say, it is made up in sections, so that the parts may be readily handled, transported from place to place, and reassembled with but little labor and by those possessed of but a small degree of mechanical skill.

Broadly stated, the invention consists of a dry closet and a garbage or refuse incinerator or burner combined in one structure, with the necessary appurtenances to render the two operative.

Referring to the drawings, A indicates a base or foundation plate designed to be placed in a slight excavation or pit and upon which rests a box or frame B, forming the main or central chamber of the structure or furnace. Said chamber is preferably formed of plates securely bolted together, doors C being provided in the end plates near the base.

Secured within the box or frame B, above the doors C, are two horizontally-disposed plates D, or there may be simply one plate, with an opening formed centrally therein extending from end to end, within which opening are placed suitable grate-bars E. Said bars are preferably of the form shown—that is, triangular in cross-section—in order that a large space may be had between them when turning them, so that the adjacent faces on the two bars stand in a vertical position, or a small opening is left between them by having the upper faces in horizontal alinement, as shown in Fig. 1. By having the grate so constructed fine fuel may be used, while at the same time provision is made for readily discharging any large refractory matter into the ash pit or chamber below the grate.

The fire-box proper is formed of a bottomless rectangular trough F, which is seated on the plate or plates D, as shown in Fig. 1.

Fuel-doors G are provided in the walls B in line with the fuel-box, and, again, above these doors H are provided, said latter doors being somewhat larger than the others.

Extending across the chamber and secured to the walls intermediate the doors G and H is a convex plate I, which bridges over that portion of the combustion-chamber directly over the fire-box. Located at each side of said plate I are troughs or pans J, which extend from end to end of the chamber and from the plate I to the side walls of the chamber B. Thus it will be seen that the troughs and plate I practically shut off the combustion-chamber proper from communication with the space above. Said troughs J are provided with suitable bearings or supports K upon their under faces, which rest upon bars or rods L, secured to the walls, suitable lever mechanism being provided for tilting the troughs over toward the fire-box.

Mounted upon the upper open end of the main chamber or box B is a stack or flue M, furnished with a suitable damper N.

In each of the side walls of the box or chamber, beneath the troughs and above the plates D, there are formed or provided openings O, while above the troughs or pans are openings P.

Extending out from the box or frame in line with the openings are trunks Q, the trunks being formed of a series of like sections bolted together, with a special end section R. The sections are preferably formed as shown in Figs. 1, 2, and 4—that is, hexagonal in cross-section—and provided with hoppers S, a hopper being formed upon each of the upper inclined faces. A horizontal web or plate T extends across from the lower inclined faces of the sections and when the parts are assembled forms a continuous excreta-receiving plate extending the length of the trunk. The location of the plate is such that it extends from the frame B, intermediate the openings O and P, to an upright wall T' of the end section R, thus forming a flue or duct U, which is in direct communication with the fire-box, and a second or upper duct or chamber V, which opens into the space above the troughs through the opening P. Duct U communicates at its outer end through section R with a flue W, which, as shown, extends back and enters stack M, a suitable damper X being provided for regulating or controlling the draft of the flue.

When the parts are all assembled, it is usual to throw a layer of soil, sawdust, or the like upon the fecal-receiving plate T. A fire is then built, damper N being closed to insure a good draft through the ducts U and flues W, or, if desired, to get the initial start for the fire damper N may be opened, troughs or pans J tilted, and dampers X closed, when there will be a direct draft up through the stack M. When the fire is started, it is of course designed to open the damper N more or less and the dampers X, the trays standing level, and under such conditions the products of combustion will pass through openings O beneath the plates T, heating the same, thence through sections R and flues W into the upper portion of stack M. Owing to the discharge of the heated air and products of combustion from flues W into the stack, a draft will be induced therein, drawing air through the openings in the hoppers, through openings P into the main chamber above the pans and plate I, and, finally, up through the stack. Plate I is designed to receive any refuse matter, garbage, street-sweepings, and the like, the matter whatever be its nature being dumped through the door or doors H thereon. Owing to the convexity of the plate, any liquid contained in the charge will drain into the troughs or pans, where it will be evaporated by the heat from the fire and the current of air passing above. The solid matter will remain for the most part on the plate I, where it will be incinerated. Any ash or residue remaining will be shoved off by the next charge or by the attendant into the pans or troughs, from which it can be directly discharged into the fire-box from time to time. Plates T being heated and there being a constant current of air passing through duct V any matter which may be upon the plates or upon or in the earth placed thereon will be desiccated. Any fumes or odors arising from either the duct or chamber V or from the matter in the pans or on plate I will of necessity come into direct contact and be commingled with the products of combustion emanating from flues W.

The capacity of flues W and of stack M should be so proportioned that each will do its proper work. By regulating the dampers the apparatus can be readily controlled whether the fire be hot or low or according to the amount of incinerating to be done. By entirely closing the damper N in the stack M and thus giving the entire draft to the flues W the whole apparatus may be heated to a degree which will completely dry out and sterilize any material resting on the fecal-receiving plate. Should sawdust have been placed thereon, it will be consumed, and any remaining matter—dried excreta, dirt, &c.—may from time to time be removed through the hoppers or moved along on the fecal receiving-plate toward the incinerating-chamber and thrown through the opening P into the pans to be dumped directly into the fire-box.

Another important feature of my invention resides in the fact that the apparatus is fly-proof, for should any flies enter through the hopper-openings they could not return, but would be drawn up through the main stack by the strong draft and there of course be killed by coming in contact with the hot gases from flues W. It will at once be seen that this is a matter of vital importance in preventing the spread of disease.

The apparatus is designed to be placed under a shelter-tent, the main stack of course extending through the top of the tent.

While I have shown the apparatus constructed with two main trunks extending out from the central chamber, it will be readily understood that but one could be used, or, if so desired, a series of trunks could be employed in connection with an incinerating-chamber common to all. So, too, while I have shown the trunk as being hexagonal in cross-section it could as well be made circular or of any other convenient form, though the construction illustrated will be found advantageous, inasmuch as the inclined sides prevent the lodgment of dirt and preclude persons from walking along or climbing over the same.

The construction of closure for the upper part of the combustion-chamber proper, comprising the plate I and the two pans or troughs J, is the preferred one, though in the broad interpretation of the invention any closure capable of receiving refuse-matter and incinerating the same would suffice. Manifestly there will be times when there will be no matter to be incinerated, but the dry closet will work equally well whether there be material on the plate I and the pans J or not. In case it be desired plate I could extend from the side wall over toward the center of the chamber and but a single pan or trough used, though the construction illustrated is the preferred one.

While I have spoken of the apparatus as designed for use in camps, it is not to be understood that its use is limited to them, for it is admirably adapted both for suburban and urban purposes where there is no sewerage or other proper sanitary system.

Having thus described my invention, what I claim is—

1. In a combined incinerator and dry closet, the combination of a combustion-chamber; an incinerator above said chamber; a dry closet in open communication with said incinerator; a main flue or stack extending from said incinerator; and a flue or duct extending from the combustion-chamber in proximity to the dry closet and discharging into the main flue.

2. In a combined incinerator and dry closet, the combination of a combustion-chamber; an incinerator forming the upper closed side of said chamber; a dry closet in open communication with said incinerator; a main flue or stack extending from said incinerator; and a flue or duct extending from the combustion-chamber in proximity to the dry closet and discharging into the main flue at a point above the incinerator.

3. In a combined incinerator and dry closet, the combination of a combustion-chamber; an incinerating-chamber located above the same and forming a substantially-closed upper side for the combustion-chamber; a dry closet in open communication with said incinerating-chamber; a main flue or stack arising from said incinerating-chamber; and a flue or duct extending from the combustion-chamber beneath the dry closet and discharging into the main flue above the incinerating-chamber.

4. In a combined incinerator and dry closet, the combination of a main or central chamber containing a fire-box in its lower portion and an incinerating-chamber above said fire-box; a main stack arising from the incinerating-chamber; a trunk extending from the side of the central chamber containing a dry closet and a duct beneath the same, said closet and duct being in direct communication with the incinerating-chamber and fire-box respectively through openings formed in the side walls of the central chamber; and a flue extending from the outer end of the duct discharging into the main stack above the incinerating-chamber.

5. In combination with a combustion-chamber closed at its upper side; a duct U extending from the side of said chamber; a duct V located above said duct U and provided with a series of hoppers; a main stack in communication with said duct V; and a flue leading from the duct U and discharging into the main stack.

6. In a combined incinerator and dry closet, the combination of a central chamber provided with a fire chamber or box in its lower portion and an incinerating-chamber above said fire-box; a stack extending up from said incinerating-chamber; a series of trunks radiating from said central chamber each trunk having a lower duct U communicating with the fire-box and an upper duct V with a series of hoppers opening thereinto, said duct V opening into the incinerating-chamber; and flues W connecting the ducts U with the stack, substantially as described.

In witness whereof I hereunto set my hand in the presence of two witnesses.

FRED P. SMITH.

Witnesses:
  HORACE A. DODGE,
  C. C. BURDINE.